United States Patent Office 3,352,875
Patented Nov. 14, 1967

3,352,875
METHYLENEBIS[(N-HYDROXYALKYL-PIPERI-
DYL) ALKYL] PIPERIDINES
Charles K. McGill, Indianapolis, Ind., assignor to Reilly
Tar & Chemical Corporation, Indianapolis, Ind., a corporation of Indiana
No Drawing. Filed July 28, 1965, Ser. No. 475,577
5 Claims. (Cl. 260—294.7)

This invention relates to new compositions of matter. More particularly, it relates to a group of new organic compounds having the structure

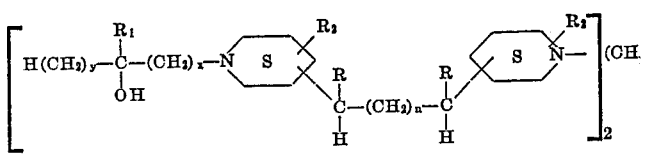

wherein R, $R_1$, and $R_2$ represent hydrogen or lower alkyl, they may be alike or they may be different; $x$ is a small integer from 0 to 4; $y$ is 0, 1, or 2; $n$ is a small integer from 0 to 4; $n'$ is a small integer from 1 to 6.

Some of my new compounds may be prepared by reacting formaldehyde with an N-hydroxyalkylpiperidyl, piperidyl alkane; others may be prepared by reacting an N-hydroxyalkylpiperidyl, piperidyl alkane with a polymethylene dihalide in the presence of an alkali metal hydroxide or carbonate.

The methylenebis[(N - hydroxyalkyl - piperidyl)alkyl] piperidines of my invention are di-functional alcohols. They have the chemical properties associated with alcohols and are capable of entering into the same type of reactions as other difunctional alcohols, within the limits imposed by the piperidine nucleus. They are non-volatile and are insoluble in water. They are somewhat soluble in organic solvents such, for example, as benzene.

Some of my methylenebis [(N-hydroxyalkyl-piperidyl) alkyl] piperidines are primary alcohols. They are also tertiary amines. These tertiary amines, with their two primary alcohol groups, can function as a catalyst and chain extender in polyurethane foams.

The methylenebis[(N - hydroxyalkyl - piperidyl)alkyl] piperidines are useful as rust preventive coatings. They are also useful as plasticizers in conjunction with polyesters used in the manufacture of fiber glass; the tertiary nitrogen provides a means of anchoring the polyester to the acidic glass fibers.

With polycarboxylic acids, such for example as adipic, terephthalic, phthalic, sebacic, and the like, my new dihydroxyalcohols form polyesters. These polyesters are characterized by the presence of tertiary nitrogens in their molecular make-up which makes them readily dyeable by acid dyes; it also improves the adhesion of rubber to fibers made from such polyesters.

The manner of carrying out my invention is described in the following specific examples. These examples are given by way of illustration only and are not intended as a limitation of my invention.

*Example 1.—1,1'-methylenebis 4-[3-(N-beta-hydroxyethyl-4-piperidyl)propyl] piperidine*

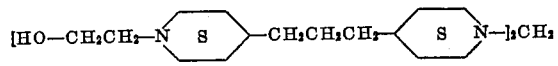

A solution of 63.5 grams of 1-(4-piperidyl)-3-(4-N-(beta-hydroxyethylpiperidyl)propane in 200 ml. of methanol is placed into a liter beaker equipped with a stirrer. The solution is stirred and 7.5 grams of a 53% solution of formaldehyde in water is added over a ten-minute period. As the last of the formaldehyde solution is added, the product, i.e. 1,1'-methylenebis 4-[3-(N-beta-hydroxyethyl-4-piperidyl)propyl] piperidine begins to separate from the solution. The temperature of the mixture is now raised to about 45° C., thereby causing the reaction product to re-dissolve. The resulting solution is stirred at 45° C. for about two hours. Then the solution is cooled to about 20–25° C., and the resulting solids are separated by filtration and dried.

The dried product has a melting point of about 116–119° C.

*Example 2.—1,1'-methylenebis 2-[2-(N-beta-hydroxyethyl-2-piperidyl)ethyl] piperidine*

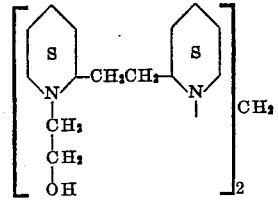

The procedure of Example 1 is repeated with the exception that I use 1-(2-piperidyl)-2-(2-N-beta-hydroxyethylpiperidyl)ethane in place of the 1-(4-piperidyl)-3-(4-N-beta-hydroxyethylpiperidyl)propane.

*Example 3.—1,1'-ethylenebis 4-[3-(N-beta-hydroxyethyl-4-piperidyl)propyl] piperidine*

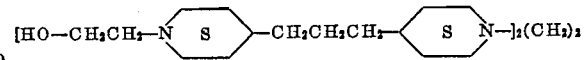

Into a two-liter flask equipped with a stirrer there are placed 127 grams of 1-(4-piperidyl)-3-(4-N-beta-hydroxyethylpiperidyl)propane, 24.8 grams of ethylene chloride, 20 grams of sodium hydroxide, and one liter of water. While stirring the reaction mixture, it is heated to about 85–100° C. As the heating continues, a reaction occurs and 1,1'-ethylenebis 4-[3-(N-beta-hydroxyethyl-4-piperidyl)propyl] piperidine, which is formed, separates from the mixture as an oil. The heating and stirring are continued for about one-half hour. Then the mixture is cooled to room temperature. The reaction product which has crystallized is separated from the liquid by filtration. It is dried and recrystallized from benzene.

The so prepared 1,1'-ethylenebis 4-[3-(N-beta-hydroxyethyl-4-piperidyl)propyl] piperidine has a freezing point of about 111° C. It is insoluble in water but soluble in hot organic solvents, such as benzene.

*Example. 4.—1,1'-ethylenebis 2-[3-(N-beta-hydroxyethyl-2-piperidyl)propyl] piperidine*

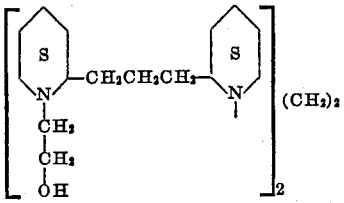

The procedure of Example 3 is repeated with the exception that I use 1-(2-piperidyl)-3-(2-N-beta-hydroxyethylpiperidyl)propane in place of the 1-(4-piperidyl)-3-(4-N-beta-hydroxyethylpiperidyl)propane.

*Example 5.—1,1'-tetramethylenebis 4-[3-(N-beta-hydroxyethyl-4-piperidyl)propyl] piperidine*

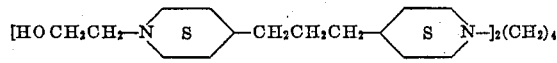

The procedure of Example 3 is followed with the exception that 32 grams of 1,4-dichlorobutane is used in place of the ethylene chloride.

*Example 6.—1,1'-ethylenebis 2-[3-(N-beta-hydroxyethyl-2-piperidyl)propyl]-6-isopropylpiperidine*

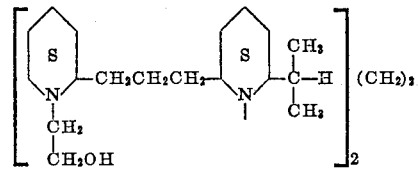

The procedure of Example 3 is repeated with the exception that 1-[2-(6-isopropyl)piperidyl]-3-(4-N-beta-hydroxyethylpiperidyl)propane is used in place of the 1-(4-piperidyl)-3-(4-N-beta-hydroxyethylpiperidyl)propane.

I claim as my invention:

1. Methylenebis[(N - hydroxyalkyl - piperidyl)alkyl] piperidines whose formula is

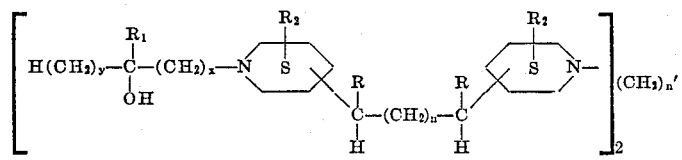

wherein $R$, $R_1$, and $R_2$ are selected from the group consisting of hydrogen and lower alkyl; $x$ is a small integer from 0 to 4; $y$ is a small integer from 0 to 2; $n$ is a small integer from 0 to 4; $n'$ is a small integer from 1 to 6.

2. The compound

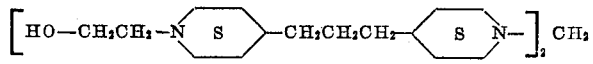

3. The compound

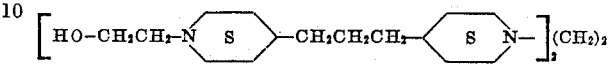

4. The compound

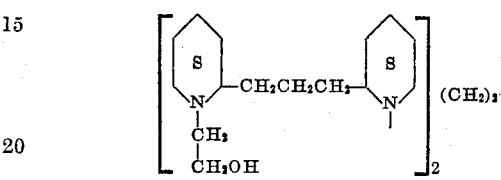

5. The compound

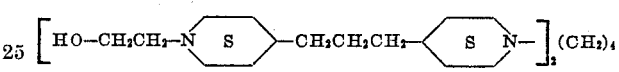

References Cited

UNITED STATES PATENTS 3,317,546    5/1967    Cislak et al. _____ 260—294 X

WALTER A. MONDANCE, *Primary Examiner.*

A. D. SPEVACK, *Assistant Examiner.*